(12) United States Patent
Jin et al.

(10) Patent No.: US 11,425,718 B2
(45) Date of Patent: *Aug. 23, 2022

(54) METHOD FOR DETERMINING CARRIER CENTER FREQUENCY AND APPARATUS

(71) Applicant: Huawei Technologies Co., Ltd., Shenzhen (CN)

(72) Inventors: Zhe Jin, Beijing (CN); Qian Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,963

(22) Filed: Dec. 18, 2020

(65) Prior Publication Data
US 2021/0112555 A1 Apr. 15, 2021

Related U.S. Application Data

(63) Continuation of application No. 16/586,771, filed on Sep. 27, 2019, now Pat. No. 10,993,234, which is a (Continued)

(30) Foreign Application Priority Data

Nov. 6, 2015 (WO) ................ PCT/CN2015/094061

(51) Int. Cl.
*H04W 72/04* (2009.01)
*H04W 48/10* (2009.01)
(Continued)

(52) U.S. Cl.
CPC ..... *H04W 72/0453* (2013.01); *H04J 11/0069* (2013.01); *H04L 27/2657* (2013.01); *H04W 48/10* (2013.01); *Y02D 30/70* (2020.08)

(58) Field of Classification Search
CPC .......... H04W 72/0413; H04W 72/044; H04W 72/0446; H04W 72/042; H04W 72/0453;
(Continued)

(56) References Cited

U.S. PATENT DOCUMENTS 5,852,630 A * 12/1998 Langberg ............ H04L 27/2647
375/219
10,455,580 B2 * 10/2019 Jin ........................ H04W 48/10
(Continued)

FOREIGN PATENT DOCUMENTS

CN 103684570 A 3/2014

*Primary Examiner* — Siu M Lee
(74) *Attorney, Agent, or Firm* — Leydig, Voit & Mayer, Ltd.

(57) ABSTRACT

A method for determining a carrier center frequency in a wireless communications system and apparatus are provided. The method includes: determining, a carrier center frequency used by a base station and UE to communicate, according to a frequency band starting frequency, and absolute radio frequency channel number, a frequency band offset, and a relative radio frequency channel number. According to this application, a time for searching for a cell by a terminal can be reduced, power consumption of the terminal can be reduced, and a battery life can be extended.

10 Claims, 2 Drawing Sheets

Determine a starting frequency, an absolute radio frequency channel number, and a frequency band offset — 101

Determine a carrier center frequency according to the starting frequency, the absolute radio frequency channel number, and the frequency band offset that are determined — 102

Related U.S. Application Data continuation of application No. 15/926,764, filed on Mar. 20, 2018, now Pat. No. 10,455,580, which is a continuation of application No. PCT/CN2016/083806, filed on May 28, 2016.

(51) Int. Cl.
*H04L 27/26* (2006.01)
*H04J 11/00* (2006.01)

(58) Field of Classification Search
CPC . H04W 72/0406; H04W 48/10; H04W 48/16; H04W 4/70; H04W 76/28; H04L 5/0051; H04L 5/0007; H04L 5/0023; H04L 5/0044; H04L 5/0094; H04L 27/2657
See application file for complete search history.

(56) References Cited

U.S. PATENT DOCUMENTS

| | | | |
|---|---|---|---|
| 10,993,234 B2* | 4/2021 | Jin | H04W 72/0453 |
| 2013/0094409 A1* | 4/2013 | Li | H04W 48/12 370/280 |
| 2017/0099682 A1* | 4/2017 | Priyanto | H04W 72/04 |

* cited by examiner

METHOD FOR DETERMINING CARRIER CENTER FREQUENCY AND APPARATUS

CROSS-REFERENCE TO RELATED APPLICATIONS

This application is a continuation of U.S. patent application Ser. No. 16/586,771, filed on Sep. 27, 2019, which is a continuation of U.S. patent application Ser. No. 15/926,764, filed on Mar. 20, 2018, now U.S. Pat. No. 10,455,580, which is a continuation of International Application No. PCT/CN2016/083806, filed on May 28, 2016, which claims priority to International Application No. PCT/CN2015/094061, filed on Nov. 6, 2015. All of the afore-mentioned patent applications are hereby incorporated by reference in their entireties.

TECHNICAL FIELD

The embodiments of the present application relate to the field of communications technologies, and in particular, to a method for determining a carrier center frequency and an apparatus.

BACKGROUND

Internet of Things (IOT) is "the Internet of connected things", and it extends a user end of the Internet to everything for information exchange and communication. Such a communication manner is also referred to as machine type communication (MTC), and a communications node is referred to as an MTC terminal. A typical application of Internet of Things includes smart metering, smart household, and the like. Because Internet of Things needs to be applied to multiple scenarios, such as an outdoor, indoor, or underground environment, many special requirements are imposed on design of Internet of Things.

First, Internet of Things needs to have strong coverage performance. Many MTC devices such as an electricity meter or a water meter are in a relatively poor coverage environment. They are usually installed in a place with an extremely weak wireless network signal, such as an indoor corner or even a basement, and in this case, a coverage enhancement technology is required to implement coverage of Internet of Things.

Second, Internet of Things needs to support a large quantity of low-rate devices. A quantity of MTC devices is far greater than that of devices used in communication between persons. However, a data packet transmitted by the MTC device is small and is delay-insensitive.

Third, a device of Internet of Things needs to be cost-effective. In many MTC applications, it is required to obtain and use MTC devices at low costs, so that the MTC devices can be deployed on a large scale.

Fourth, a device of Internet of Things needs to feature low energy consumption. In most cases, an MTC device is battery-powered. However, in many cases, an MTC device is required to operate properly for more than a decade without a battery replacement, and this requires that the MTC device can operate with extremely low energy consumption.

So far, an expected objective of low costs, wide coverage, and low energy consumption still cannot be achieved. To satisfy the foregoing special requirements, in a recent project of Narrowband Internet of Things (NB-IOT), three deployment modes are defined:

(1) Standalone operation: That is, a standalone frequency band is used, for example, one or more carriers of a Global system for mobile communications (GSM) network is used.

(2) In-band operation: One or more physical resource blocks (PRB) in a Long Term Evolution (LTE) carrier are used.

(3) Guard band operation: An unused resource block in an LTE carrier guard band is used.

In the foregoing three modes, carrier center frequency locations for deploying NB-IoT may be different, and may be inconsistent with an original carrier center frequency defined based on a 100 kHz raster in LTE. However, when accessing a network, a terminal does not know where an NB-IoT system is deployed, let alone which specific deployment mode is used. Therefore, because a carrier center location of NB-IoT in the in-band operation and the guard band operation is inconsistent with an original carrier center location in LTE, in this case, if the terminal continues to search for an NB-IoT cell by using the carrier center defined in LTE, the terminal possibly cannot find a cell, and frequent cell searching consumes much power and reduces a battery life of an NB-IoT terminal.

SUMMARY

Embodiments of the present application provide a method for determining a carrier center frequency and an apparatus, to find a carrier center frequency suitable for NB-IoT.

According to one aspect, an embodiment of this application provides a method for determining a carrier center frequency, where the method is applied to an NB-IoT system and includes: determining a frequency band starting frequency, an absolute radio frequency channel number, and a frequency band offset; and determining a carrier center frequency according to the frequency band starting frequency, the absolute radio frequency channel number, and the frequency band offset that are determined.

In a possible design, the carrier center frequency $F^{NB}_{DL}$ is a downlink carrier center frequency, and the determining a carrier center frequency according to the frequency band starting frequency, the absolute radio frequency channel number, and the frequency band offset that are determined includes:

$$F^{NB}_{DL}=F^{NB}_{DL\_low}+0.0025*(N^{NB}_{DL}-N^{NB}_{\mathit{Offs-DL}});$$

where $F^{NB}_{DL\_low}$ is a frequency band downlink frequency band starting frequency, $N^{NB}_{\mathit{Offs-DL}}$ is a frequency band downlink offset, a value of $N^{NB}_{\mathit{Offs-DL}}$ is 40 times that of a frequency band downlink offset $N_{\mathit{Offs-DL}}$ of an LTE system, $N^{NB}_{DL}$ is a downlink absolute radio frequency channel number, a value range of $N^{NB}_{DL}$ is [min*40, (max+1)*40-1], and [min, max] is a value range of an absolute radio frequency channel number $N_{DL}$ of the LTE system.

In a possible design, the method further includes: determining a relative radio frequency channel number; and the determining a carrier center frequency includes:

$$F^{NB}_{DL}=F_{DL\_low}+0.1*(N_{DL}-N_{\mathit{Offs-DL}})+0.0025*M_{DL};$$

where $M_{DL}$ is a downlink relative radio frequency channel number, a value range of which includes any one in the following set: −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19.

In a possible design, the carrier center frequency $F^{NB}_{DL}$ is a downlink carrier center frequency, and the determining a carrier center frequency according to the frequency band starting frequency, the absolute radio frequency channel number, and the frequency band offset that are determined includes:

$$F^{NB}_{DL}=F^{NB}_{DL\_low}+0.0025*((2*N^{NB}_{DL}+1)-N^{NB}_{Offs\text{-}DL});$$

where $F^{NB}_{DL\_low}$ is a frequency band downlink frequency band starting frequency, $N^{NB}_{Offs\text{-}DL}$ is a frequency band downlink offset, a value of $N^{NB}_{Offs\text{-}DL}$ is 40 times that of a frequency band downlink offset $N_{Offs\text{-}DL}$ of an LTE system, $N^{NB}_{DL}$ is a downlink absolute radio frequency channel number, a value range of $N^{NB}_{DL}$ is [min*20, (max+1)*20-1], and [min, max] is a value range of an absolute radio frequency channel number $N_{DL}$ of the LTE system.

In a possible design, the method further includes: determining a relative radio frequency channel number $M_{DL}$; and the determining a carrier center frequency includes:

$$F^{NB}_{DL}=F_{DL\_low}+0.1*(N_{DL}-N_{Offs\text{-}DL})+0.0025*(2M_{DL}+1);$$

where $M_{DL}$ is a downlink relative radio frequency channel number, a value range of which includes any one in the following set: −10, −9, −8, −7, −6, −5, −4, −3, −2, −1, 0, 1, 2, 3, 4, 5, 6, 7, 8, 9.

In a possible design, the carrier center frequency $F^{NB}_{UL}$ is an uplink carrier center frequency, and the determining a carrier center frequency according to the frequency band starting frequency, the absolute radio frequency channel number, and the frequency band offset that are determined includes:

$$F^{NB}_{UL}=F^{NB}_{UL\_low}+0.0025*(N^{NB}_{UL}-N^{NB}_{Offs\text{-}UL});$$

where $F^{NB}_{UL\_low}$ is a frequency band uplink frequency band starting frequency, $N^{NB}_{Offs\text{-}UL}$ is a frequency band uplink offset, a value of $N^{NB}_{Offs\text{-}UL}$ is 40 times that of a frequency band uplink offset $N_{Offs\text{-}UL}$ of an LTE system, $N^{NB}_{UL}$ is an uplink absolute radio frequency channel number, a value range of $N^{NB}_{UL}$ is [min*40, (max+1)*40-1], and [min, max] is a value range of an absolute radio frequency channel number $N_{DL}$ of the LTE system.

In a possible design, the method further includes: determining a relative radio frequency channel number; and the determining a carrier center frequency includes:

$$F^{NB}_{UL}=F_{UL\_low}+0.1*(N_{UL}-N_{Offs\text{-}UL})+0.0025*M_{UL};$$

where $M_{UL}$ is an uplink relative radio frequency channel number, a value range of which includes any one in the following set: −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19.

In a possible design, the carrier center frequency $F^{NB}_{UL}$ is an uplink carrier center frequency, and the determining a carrier center frequency according to the frequency band starting frequency, the absolute radio frequency channel number, and the frequency band offset that are determined includes:

$$F^{NB}_{UL}=F^{NB}_{UL\_low}+0.0025*(2*N^{NB}_{UL}-N^{NB}_{Offs\text{-}UL});$$

where $F^{NB}_{UL\_low}$ is a frequency band uplink frequency band starting frequency, $N^{NB}_{Offs\text{-}UL}$ is a frequency band uplink offset, a value of $N^{NB}_{Offs\text{-}UL}$ is 40 times that of a frequency band uplink offset $N_{Offs\text{-}UL}$ of an LTE system, $N^{NB}_{UL}$ is an uplink absolute radio frequency channel number, a value range of $N^{NB}_{UL}$ is [min*20, (max+1)*20-1], and [min, max] is a value range of an absolute radio frequency channel number Nut._, of the LTE system.

In a possible design, the method further includes: determining a relative radio frequency channel number $M_{UL}$; and the determining a carrier center frequency includes:

$$F^{NB}_{UL}=F_{UL\_low}+0.1*(N_{UL}-N_{Offs\text{-}UL})+0.0025*(2M_{UL});$$

where $M_{UL}$ is an uplink relative radio frequency channel number, a value range of which includes any one in the following set: −10, −9, −8, −7, −6, −5, −4, −3, −2, −1, 0, 1, 2, 3, 4, 5, 6, 7, 8, 9.

According to another aspect, an embodiment of the present application provides a base station, where the base station has a function of implementing base station behavior in the foregoing method design. The function may be implemented by hardware, or may be implemented by hardware by executing corresponding software. The hardware or the software includes one or more modules corresponding to the foregoing function.

In a possible design, a structure of the base station includes a processor and a transmitter, where the processor is configured to support performing, by the base station, corresponding functions in the foregoing method. The transmitter is configured to support communication between the base station and user equipment (UE) and send information or an instruction used in the foregoing method to the UE. The base station may further include a memory, where the memory is configured to couple to the processor and store a program instruction and data that are necessary for the base station.

According to still another aspect, an embodiment of the present application provides UE, where the UE has a function of implementing UE behavior in the foregoing method design. The function may be implemented by hardware, or may be implemented by hardware by executing corresponding software. The hardware or the software includes one or more modules corresponding to the foregoing function. The modules may be software and/or hardware.

In a possible design, a structure of the UE includes a receiver and a processor, where the receiver is configured to support receiving, by the UE, a first long discontinuous reception (DRX) cycle, a second long DRX cycle, an activation DRX instruction, a deactivation DRX instruction, or another instruction that the foregoing base station configures for the UE. The processor controls the UE to receive paging according to the first long DRX cycle, the deactivation DRX instruction, or the second long DRX cycle that is received by the receiver.

Compared with the conventional art, in the solutions provided in the present application, three deployment modes may be implemented for NB-IoT. This reduces a time in searching for a cell by a terminal, reduces power consumption of the terminal, and extends a battery life.

DESCRIPTION OF EMBODIMENTS

To make objectives, technical solutions, and advantages of embodiments of the present application clearer, the following clearly describes the technical solutions in the embodiments of the present application with reference to accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

A network architecture and a service scenario described in the embodiments of the present application are used to describe the technical solutions in the embodiments of the present application more clearly, but are not intended to limit the technical solutions provided in the embodiments of the present application. A person of ordinary skill in the art may understand that, with evolution of the network architecture and appearance of a new service scenario, the technical solutions provided in the embodiments of the present application are also applicable to a similar technical problem.

In this application, terms "network" and "system" are usually interchangeably used, but meanings thereof may be understood by a person of ordinary skill in the art. User equipment UE in this application may include various handheld devices, in-vehicle devices, wearable devices, or computing devices that have a wireless communications function, or other processing devices connected to a wireless modem, and user equipment (UE), a mobile station (MS), a terminal, terminal equipment that are in various forms, and the like. For ease of description, in this application, all the devices mentioned above are referred to as user equipment or UE. A base station (BS) in the present application is an apparatus that is deployed in a radio access network and configured to provide a wireless communications function for the UE. The base station may include a macro base station, a micro base station, a relay node, an access point, and the like that are in various forms. In systems using different radio access technologies, a device having a base station function may have different names. For example, a device having a base station function is referred to as an evolved NodeB (eNB or eNodeB) in an LTE network, referred to as a NodeB in a 3rd Generation 3G network, or the like. For ease of description, in this application, all the foregoing apparatuses that provide a wireless communications function for the UE are referred to as a base station or a BS.

Figure 1:
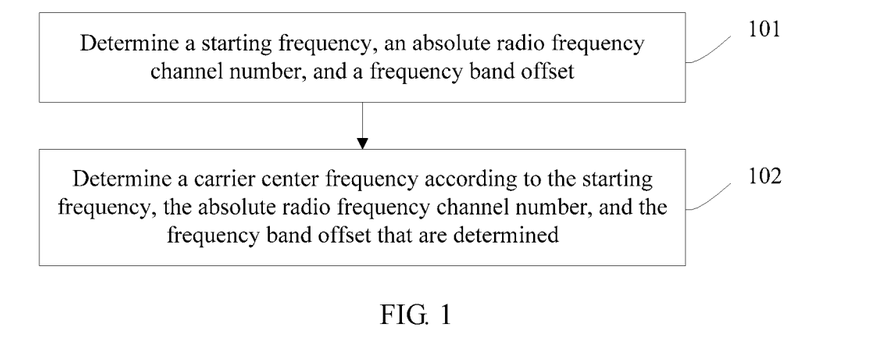
FIG. 1 is a schematic diagram of a possible process for determining a carrier center frequency according to an embodiment of the present application.

FIG. 1 shows a method for determining a carrier center frequency according to an embodiment of the present application. The method is applied to an NB-IoT system. The following describes implementations of the present application in detail with reference to FIG. 1.

S101. Determine a frequency band starting frequency, an absolute radio frequency channel number, and a frequency band offset.

S102. Determine a carrier center frequency according to the frequency band starting frequency, the absolute radio frequency channel number, and the frequency band offset that are determined.

Specifically, this embodiment of the present application provides several optional manners to determine a downlink carrier center frequency.

A feasible manner of determining the downlink carrier center frequency is:

$$F^{NB}_{DL}=F^{NB}_{DL\_low}+0.0025*(N^{NB}_{DL}-N^{NB}_{Offs-DL});$$

where $F^{NB}_{DL\_low}$ is a frequency band downlink frequency band starting frequency, a channel frequency raster is 0.0025 (MHz), $N^{NB}_{Offs-DL}$ is a frequency band downlink offset, a value of $N^{NB}_{Offs-DL}$ is 40 times that of a frequency band downlink offset $N_{Offs-DL}$ of an LTE system, $N^{NB}_{DL}$ is a downlink absolute radio frequency channel number, a value range of $N^{NB}_{DL}$ is [min*40, (max+1)*40−1], and [min, max] is a value range of an absolute radio frequency channel number $N_{DL}$ of the LTE system. $N_{DL}$ is an ARFCN of NB-IoT. Specifically, for a value of each parameter on the right side of the foregoing equation, refer to Table 1.

TABLE 1

| Parameter | LTE (placeholder) Downlink | NB-IoT (placeholder) |
|---|---|---|
| $F_{DL\_low}$ | x | Same as "x" |
| $N_{Offs-DL}$ | y | y * 40 |
| Range of $N_{DL}$ for each operating band | [min, max] | [min * 40, (max + 1) * 40 − 1] |

Optionally, another feasible manner of determining the downlink carrier center frequency is:

$$F^{NB}_{DL}=F_{DL\_low}+0.1*(N_{DL}-N_{Offs-DL})+0.0025*M_{DL};$$

where $M_{DL}$ is a downlink relative radio frequency channel number, a value range of which includes any one in the following set: −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19. A channel frequency raster is 0.0025 (MHz).

Optionally, another feasible manner of determining the downlink carrier center frequency is:

$$F^{NB}_{DL}=F^{NB}_{DL\_low}+0.0025*((2*N^{NB}_{DL}+1)-N^{NB}_{Offs-DL});$$

where $F^{NB}_{DL\_low}$ is a frequency band downlink frequency band starting frequency, $N^{NB}_{Offs-DL}$ is a frequency band downlink offset, a value of $N^{NB}_{Offs-DL}$ is 40 times that of a frequency band downlink offset $N_{Offs-DL}$ of an LTE system, $N^{NB}_{DL}$ is a downlink absolute radio frequency channel number, a value range of $N^{NB}_{DL}$ is [min*20, (max+1)*20−1], and [min, max] is a value range of an absolute radio frequency channel number $N_{DL}$ of the LTE system. Specifically, for a value of each parameter on the right side of the foregoing equation, refer to Table 2.

The downlink carrier center frequency $F^{NB}_{DL}$ determined in this manner is a subset of center frequencies determined in the foregoing manner, including odd multiples of the channel frequency raster.

TABLE 2

| Parameter | LTE (placeholder) Downlink | NB-IoT (placeholder) |
|---|---|---|
| $F_{DL\_low}$ | x | Same as "x" |
| $N_{Offs-DL}$ | y | y * 40 |
| Range of $N_{DL}$ for each operating band | [min, max] | [min * 20, (max + 1) * 20 − 1] |

Optionally, another feasible manner of determining the downlink carrier center frequency is:

$$F^{NB}_{DL}=F_{DL\_low}+0.1*(N_{DL}-N_{Offs-DL})+0.0025*(2M_{DL}+1);$$

wherein $M_{DL}$ is a downlink relative radio frequency channel number, a value range of which includes any one in the following set: −10, −9, −8, −7, −6, −5, −4, −3, −2, −1, 0, 1, 2, 3, 4, 5, 6, 7, 8, and 9.

The downlink carrier center frequency $F^{NB}_{DL}$ determined in this manner is a subset of center frequencies determined in the foregoing manner, including odd multiples of the channel frequency raster or integer multiples of an LTE channel raster 0.1 MHz.

This embodiment of the present application further provides several optional manners to determine an uplink carrier center frequency.

A feasible manner of determining the uplink carrier center frequency is:

$$F^{NB}{}_{UL} = F^{NB}{}_{UL\_low} + 0.0025 * (N^{NB}{}_{UL} - N^{NB}{}_{Offs-UL});$$

where $F^{NB}{}_{UL\_low}$ is a frequency band uplink frequency band starting frequency, $N^{NB}{}_{Offs-UL}$ is a frequency band uplink offset, a value of $N^{NB}{}_{Offs-UL}$ is 40 times that of a frequency band uplink offset $N_{Offs-UL}$ of an LTE system, $N^{NB}{}_{UL}$ is an uplink absolute radio frequency channel number, a value range of $N^{NB}{}_{UL}$ is [min*40, (max+1)*40−1], and [min, max] is a value range of an absolute radio frequency channel number $N_{DL}$ of the LTE system. $N_{UL}$ is an ARFCN of NB-IoT. Specifically, for a value of each parameter on the right side of the foregoing equation, refer to Table 3.

TABLE 3

| Parameter | LTE (placeholder) Uplink | NB-IoT (placeholder) |
|---|---|---|
| $F_{UL\_low}$ | x | Same as "x" |
| $N_{Offs-UL}$ | y | y * 40 |
| Range of $N_{UL}$ for each operating band | [min, max] | [min * 40, (max + 1) * 40 − 1] |

Optionally, another feasible manner of determining the uplink carrier center frequency is:

$$F^{NB}{}_{UL} = F_{UL\_low} + 0.1 * (N_{UL} - N_{Offs-UL}) + 0.0025 * M_{UL};$$

where $M_{UL}$ is an uplink relative radio frequency channel number, a value range of which includes any one in the following set: −20, −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19.

$N_{DL}$ and $N_{UL}$ are ARFCNs of NB-IoT, and their values are the same as those of $N_{DL}$ and $N_{UL}$ of an LTE system. Values of $N_{Offs-DL}$ and $N_{Offs-UL}$ are the same as those of $N_{Offs-DL}$ and $N_{Offs-UL}$ of the LTE system. $M_{DL}$ and $M_{UL}$ are newly-added parameters, may be defined as RRFCNs (relative RFCN), and their value ranges are shown above.

Optionally, another feasible manner of determining the uplink carrier center frequency is:

$$F^{NB}{}_{UL} = F^{NB}{}_{UL\_low} + 0.0025 * (2 * N^{NB}{}_{UL} - N^{NB}{}_{Offs-UL});$$

where $F^{NB}{}_{UL\_low}$ is a frequency band uplink frequency band starting frequency, $N^{NB}{}_{Offs-UL}$ is a frequency band uplink offset, a value of $N^{NB}{}_{Offs-UL}$ is 40 times that of a frequency band uplink offset $N_{Offs-UL}$ of an LTE system, $N^{NB}{}_{DL}$ is an uplink absolute radio frequency channel number, a value range of $N^{NB}{}_{UL}$ is [min*20, (max+1)*20−1], and [min, max] is a value range of an absolute radio frequency channel number $N_{UL}$ of the LTE system. Specifically, for a value of each parameter on the right side of the foregoing equation, refer to Table 4.

TABLE 4

| Parameter | LTE (placeholder) Uplink | NB-IoT (placeholder) |
|---|---|---|
| $F_{UL\_low}$ | x | Same as "x" |
| $N_{Offs-UL}$ | y | y * 40 |
| Range of $N_{UL}$ for each operating band | [min, max] | [min * 20, (max + 1) * 20 − 1] |

The uplink carrier center frequency $F^{NB}{}_{UL}$ determined in this manner is a subset of center frequencies determined in the foregoing manner, including even multiples of the channel frequency raster.

Optionally, another feasible manner of determining the uplink carrier center frequency is:

$$F^{NB}{}_{UL} = F_{UL\_low} + 0.1 * (N_{UL} - N_{Offs-UL}) + 0.0025 * (2M_{UL});$$

where $M_{UL}$ is an uplink relative radio frequency channel number, a value range of which includes any one in the following set: −10, −9, −8, −7, −6, −5, −4, −3, −2, −1, 0, 1, 2, 3, 4, 5, 6, 7, 8, 9. The uplink carrier center frequency $F^{NB}{}_{UL}$ determined in this manner is a subset of center frequencies determined in the foregoing manner, including even multiples of the channel frequency raster.

Figure 2:
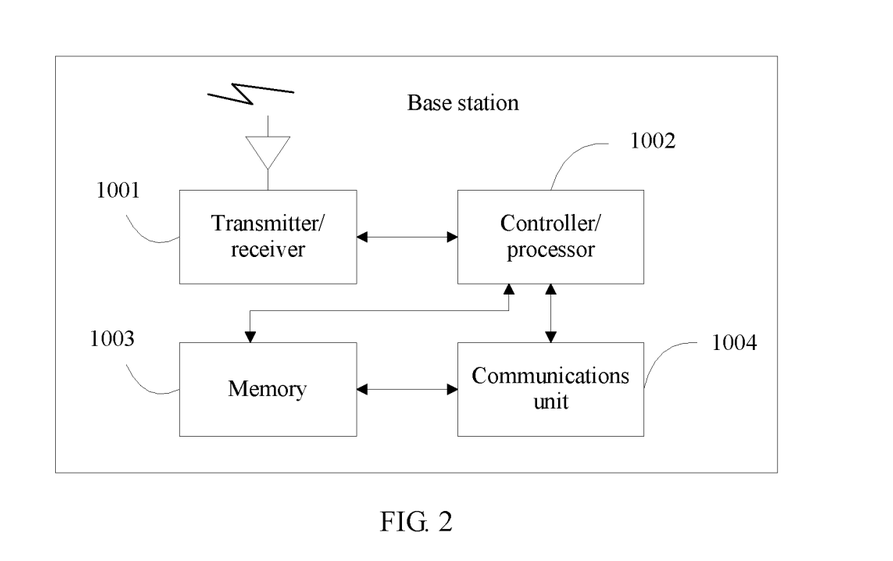
FIG. 2 is a schematic structural diagram of a base station according to an embodiment of the present application.

FIG. 2 shows a possible schematic structural diagram of a base station in the foregoing embodiment.

The base station includes a transmitter/receiver 1001, a controller/processor 1002, a memory 1003, and a communications unit 1004. The transmitter/receiver 1001 is configured to support information sending and receiving between the base station and the UE in the foregoing embodiment, and support radio communication between the UE and another UE. The controller/processor 1002 is configured to perform various functions for communicating with the UE. In an uplink, an uplink signal from the UE is received by an antenna, demodulated by the receiver 1001, and further processed by the controller/processor 1002 to restore service data and signaling information that are sent by the UE. In a downlink, service data and a signaling message are processed by the controller/processor 1002, and modulated by the transmitter 1001 to generate a downlink signal, and the downlink signal is transmitted to the UE by the antenna. The controller/processor 1002 is further configured to perform a processing process that includes the base station in this embodiment of the present application and/or another process of technology described in this application. The memory 1003 is configured to store program code and data of the base station. The communications unit 1004 is configured to support communication between the base station and another network entity. For example, the communications unit 1004 is configured to support communication between the base station and another communications network entity shown in FIG. 2, such as an MME, an SGW, and/or a PGW in a core network EPC.

Figure 3:
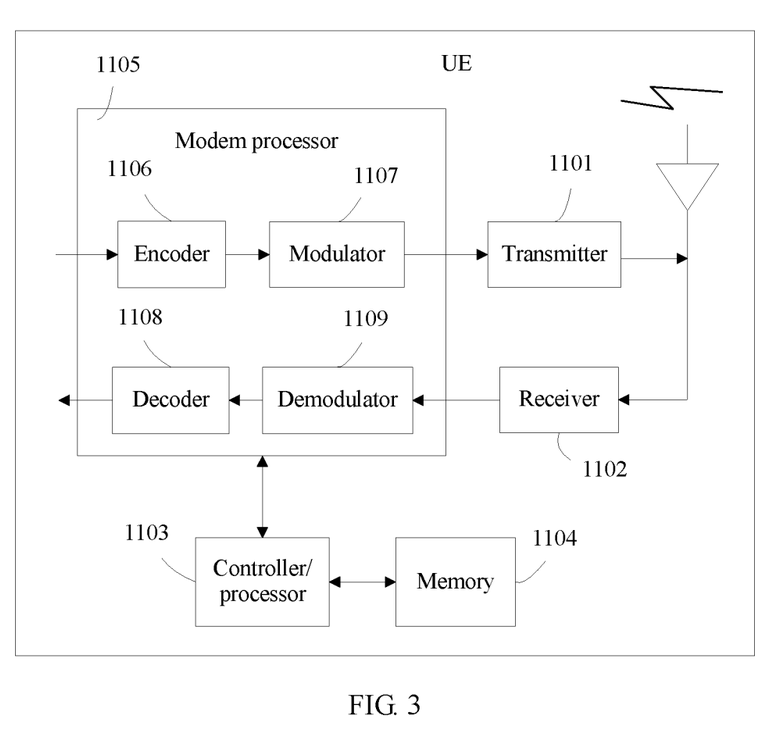
FIG. 3 is a schematic structural diagram of UE according to an embodiment of the present application.

It may be understood that FIG. 3 merely shows a simplified design of the base station. In actual application, the base station may include any quantity of transmitters, receivers, processors, controllers, memories, communications units, and the like, and all base stations that can implement the present application fall within the protection scope of the present application.

FIG. 3 shows a simplified schematic diagram of a possible design structure of UE in the foregoing embodiment. The UE includes a transmitter 1101, a receiver 1102, a controller/processor 1103, a memory 1104, and a modem processor 1105.

The transmitter 1101 adjusts (for example, by means of analog conversion, filtering, amplification, and up-conversion) an output sampling and generates an uplink signal. The uplink signal is transmitted by using an antenna to the base station in the foregoing embodiment. In a downlink, the antenna receives a downlink signal transmitted by the base station in the foregoing embodiment. The receiver 1102 adjusts (for example, by means of filtering, amplification, down-conversion, and digitization) a signal received from the antenna and provides an input sampling. In the modem processor 1105, an encoder 1106 receives service data and a signaling message to be sent in an uplink, and processes (for example, by means of formatting, coding, and interleaving) the service data and the signaling message. A modulator 1107 further processes (for example, by means of symbol mapping and modulation) the encoded service data and signaling message, and provides an output sampling. A demodulator 1109 processes (for example, by means of demodulation) the input sampling and provides symbol estimation. A decoder 1108 processes (for example, by means of de-interleaving and decoding) the symbol estimation and provides the decoded data and signaling message that are sent to the UE. The encoder 1106, the modulator 1107, the demodulator 1109, and the decoder 1108 may be implemented by using the integrated modem processor 1105. These units perform processing according to a radio access technology (such as an access technology of LTE or another evolved system) used by a radio access network.

The method and the apparatus are based on a same inventive concept. Because a problem-solving principle of the apparatus is similar to that of the method, mutual reference may be made to implementations of the method and the apparatus, and repeated description is not provided.

It should be noted that, module division in this embodiment of the present application is an example, is merely logical function division, and may be other division in actual implementation. In addition, function modules in embodiments of the present application may be integrated into one processing module, or each of the modules may exist alone physically, or two or more modules are integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of the present application essentially, or the part contributing to the conventional art, or all or a part of the technical solutions may be implemented in the form of a software product. The computer software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

A person skilled in the art should understand that the embodiments of the present application may be provided as a method, a system, or a computer program product. Therefore, the present application may use a form of hardware-only embodiments, software-only embodiments, or embodiments with a combination of software and hardware. Moreover, the present application may use a form of a computer program product that is implemented on one or more computer-usable storage media (including but not limited to a disk memory, a CD-ROM, an optical memory) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

Although some embodiments of the present application have been described, a person skilled in the art can make changes and modifications to these embodiments once they learn the basic inventive concept. Therefore, the following claims are intended to be construed as to cover the embodiments and all changes and modifications falling within the scope of the present application.

Obviously, a person skilled in the art can make various modifications and variations to the embodiments of the present application without departing from the spirit and scope of the embodiments of the present application. The present application is intended to cover these modifications and variations provided that they fall within the scope of protection defined by the following claims and their equivalent technologies.

What is claimed is:

1. A method for determining a carrier center frequency, comprising:

determining a downlink frequency band starting frequency, a downlink absolute radio frequency channel number, a downlink frequency band offset, and a downlink relative radio frequency channel number; and determining a downlink carrier center frequency $F^{NB}_{DL}$, wherein $F^{NB}_{DL}$ satisfies the following relationship:

$$F^{NB}_{DL} = F_{DL\_low} + 0.1 * (N_{DL} - N_{Offs\text{-}DL}) + 0.0025 * (2M_{DL} + 1);$$

wherein $F_{DL\_low}$ is the downlink frequency band starting frequency, $N_{DL}$ is the downlink absolute radio frequency channel number, and $N_{Offs\text{-}DL}$ is the downlink frequency band offset; and wherein $M_{DL}$ is the downlink relative radio frequency channel number, $M_{DL}$ is one value in a set of values, and the set of values comprises: −10, −9, −8, −7, −6, −5, −4, −3, −2, −1, 0, 1, 2, 3, 4, 5, 6, 7, 8, 9.

2. The method according to claim 1, wherein determining the downlink carrier center frequency $F^{NB}_{DL}$ comprises: determining $F^{NB}_{DL}$ in a narrowband internet of things (NB-IOT) system.

3. The method according to claim 1, wherein determining the downlink carrier center frequency $F^{NB}_{DL}$ comprises: determining $F^{NB}_{DL}$ in one or more of the following modes: standalone operation, in-band operation, or guard band operation.

4. An apparatus, comprising:
a processor and a non-transitory storage medium containing instructions that, when executed by the processor, cause the processor to:
determine a downlink frequency band starting frequency, a downlink absolute radio frequency channel number, a downlink frequency band offset, and a downlink relative radio frequency channel number; and
determine a downlink carrier center frequency $F^{NB}_{DL}$, wherein $F^{NB}_{DL}$ satisfies the following relationship:

$$F^{NB}_{DL}=F_{DL\_low}+0.1*(N_{DL}-N_{Offs\text{-}DL})+0.0025*(2M_{DL}+1);$$

wherein $F_{DL\_low}$ is the downlink frequency band starting frequency, $N_{DL}$ is the downlink absolute radio frequency channel number, and $N_{Offs\text{-}DL}$ is the downlink frequency band offset; and wherein $M_{DL}$ is the downlink relative radio frequency channel number, $M_{DL}$ is one value in a set of values, and the set of values comprises: −10, −9, −8, −7, −6, −5, −4, −3, −2, −1, 0, 1, 2, 3, 4, 5, 6, 7, 8, 9.

5. The apparatus according to claim 4, wherein the instructions cause the processor to: determine $F^{NB}_{DL}$ in a narrowband internet of things (NB-TOT) system.

6. The apparatus according to claim 4, wherein the instructions cause the processor to: determine $F^{NB}_{DL}$ in one or more of the following modes: standalone operation, in-band operation, or guard band operation.

7. A non-transitory computer readable medium comprising instructions that, when executed by a processor, cause the processor to execute at least the following operations including:
determining a downlink frequency band starting frequency, a downlink absolute radio frequency channel number, a downlink frequency band offset, and a downlink relative radio frequency channel number; and
determining a downlink carrier center frequency $F^{NB}_{DL}$, wherein $F^{NB}_{DL}$ satisfies the following relationship:

$$F^{NB}_{DL}=F_{DL\_low}+0.1*(N_{DL}-N_{Offs\text{-}DL})+0.0025*(2M_{DL}+1);$$

wherein $F_{DL\_low}$ is the downlink frequency band starting frequency, $N_{DL}$ is the downlink absolute radio frequency channel number, and $N_{Offs\text{-}DL}$ is the downlink frequency band offset; and wherein $M_{DL}$ is the downlink relative radio frequency channel number, $M_{DL}$ is one value in a set of values, and the set of values comprises: −10, −9, −8, −7, −6, −5, −4, −3, −2, −1, 0, 1, 2, 3, 4, 5, 6, 7, 8, 9.

8. The non-transitory computer readable medium according to claim 7, wherein the instructions cause the processor to: determine $F^{NB}_{DL}$ in a narrowband internet of things (NB-IOT) system.

9. The non-transitory computer readable medium according to claim 7, wherein the instructions cause the processor to: determine $F^{NB}_{DL}$ in one or more of the following modes: standalone operation, in-band operation, or guard band operation.

10. The apparatus according to claim 4, wherein the apparatus is a terminal.

\* \* \* \* \*

UNITED STATES PATENT AND TRADEMARK OFFICE
CERTIFICATE OF CORRECTION

| | |
|---|---|
| PATENT NO. | : 11,425,718 B2 |
| APPLICATION NO. | : 17/127963 |
| DATED | : August 23, 2022 |
| INVENTOR(S) | : Jin et al. |

It is certified that error appears in the above-identified patent and that said Letters Patent is hereby corrected as shown below:

In the Claims

Claim 5: Column 12, Line 3: "narrowband internet of things (NB-TOT) system." should read
-- narrowband internet of things (NB-IOT) system. --.

Claim 7: Column 12, Line 8: "Anon-transitory computer readable medium compris-" should read
-- A non-transitory computer readable medium compris- --.

Signed and Sealed this
Third Day of January, 2023

*Katherine Kelly Vidal*

Katherine Kelly Vidal
*Director of the United States Patent and Trademark Office*